United States Patent Office 3,674,434
Patented July 4, 1972

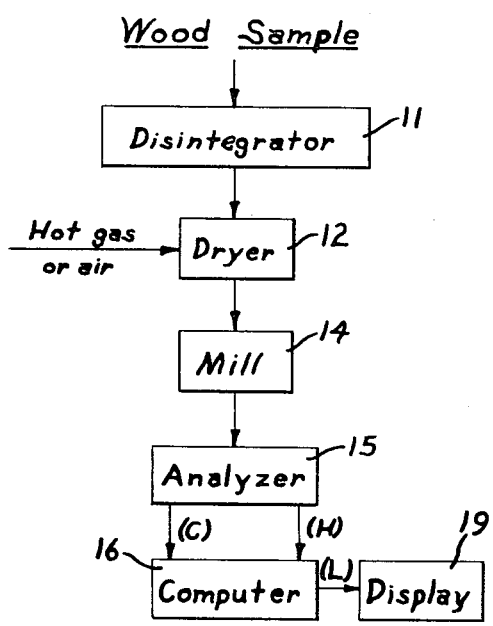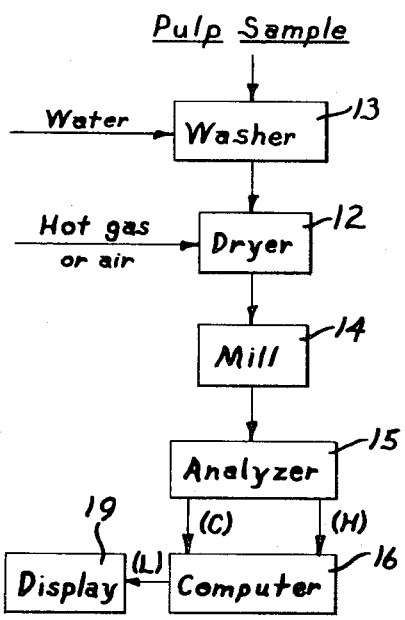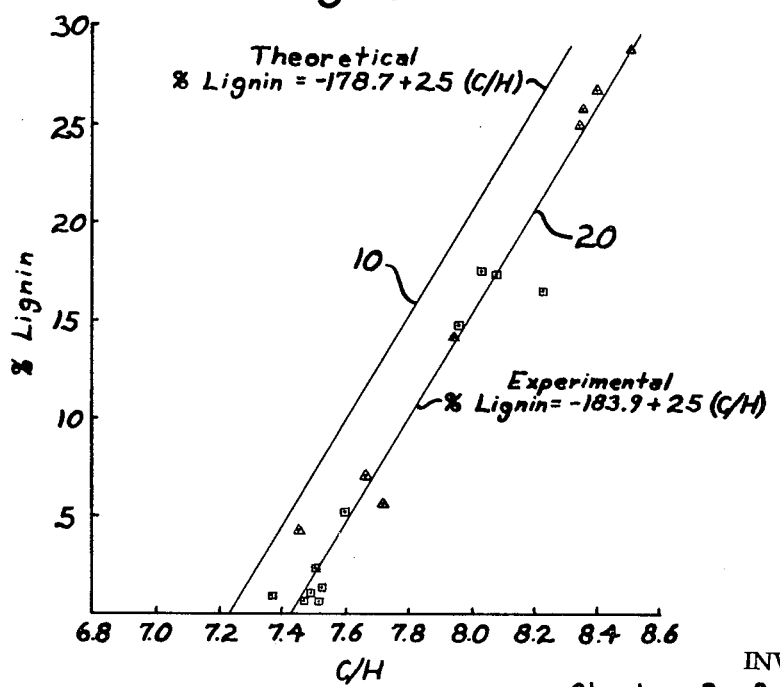

3,674,434
METHOD AND APPARATUS FOR DETERMINING LIGNIN CONTENT
Charles R. Pottenger, Cloquet, Minn., assignor to Potlatch Forests, Inc., San Francisco, Calif.
Filed July 28, 1970, Ser. No. 58,858
Int. Cl. G01m 33/46
U.S. Cl. 23—230 R                 6 Claims

ABSTRACT OF THE DISCLOSURE

A method and apparatus for determining lignin content of wood or wood pulp by direct measurement. The process is based upon a theoretical relationship between lignin content and the ratio of elemental carbon to elemental hydrogen in a sample of wood material. It involves reduction of particle size as necessary for elemental analysis, washing of a sample, drying the sample to a predetermined moisture content and analysis of the sample to determine the elemental ratio of carbon to hydrogen. The lignin content of the sample is then determined according to a linear relationship. The apparatus comprises components chosen to carry out the method steps.

BACKGROUND OF THE INVENTION

The process described herein provides a direct method of determining lignin content in a sample of wood or wood pulp. Wood, being a natural organic material, has a highly complex chemical structure. As related to commercial pulping operations, the basic components of wood may be generally described as cellulose, hemicelluloses, lignin and extractives. The desired end result of a pulping operation is the removal of the extractives and most or all of the lignin. The extractives are readily removed by solvents. The controlled removal of lignin constitutes the great bulk of a pulping operation, and measurement of the amount of lignin left in the pulp at various stages of such an operation provides the most direct measurement of pulping efficiency.

Despite its essential importance in pulping, many facts concerning lignin remain a mystery. Lignin is a complex polymer which functions as a filler or cementing substance to impart rigidity to wood tissue. Its exact structure is not known. This can be explained by the complexity of the polymer, which cannot be converted to its monomer parts in good yield without alterations of the structural units. When broken down, the structural units are not all identical in structure nor linked to one another in an identical manner. Lignin is difficult to isolated from other wood components.

Present methods of measuring lignin content are very indirect and involve complicated and time-consuming measurements. All recognized present methods further involve the necessity of weighing the original sample of wet pulp within very close limits which can be attained only under careful laboratory procedures. Such methods are not readily useful for commercial processing control purposes on a repetitive basis. Control of pulping procedures today is governed primarily by judgment of individuals who visually inspect periodic samples taken from the stock and adjust the process controls according to value judgments made by them.

The most widely used method of arriving at a recognized quantitative lignin content comprises a series of procedures that take approximately one-half hour to accomplish and which lead to an empirical result known in the industry as a Permanganate Number. This value has been experimentally related to lignin content. One prime difficulty with this test is the extremely fine measurement of the initial sample weight, which must be a one gram sample weight, with a tolerance of ±0.02 gram. Both the size of the sample and the limited tolerance require extremely accurate laboratory procedures which must be very carefully followed in order to achieve any meaningful results.

Another apparatus and test procedure currently available is designed to give a rapid estimate of lignin content in pulps below 65% yield. This device has been developed by the Institute of Paper Chemistry and results in the determination of a value termed "The Nu Number." In common with almost every other prior test for lignin content, this process also requires an exact quantity of pulp for each determination, which adds greatly to the complexity of instrumentation. In addition, the test has a limited range of application, since it is not valid in pulps above 65% yield.

It is an object of the present method and apparatus to provide a reliable and rapid direct measurement of lignin content. The present method is applicable to pulps of any yield and having any lignin content at any stage in the pulping process as well as to raw wood. No information relating to sample weight is required. The only sample requirement is that each sample must be dried to a constant known moisture content.

SUMMARY OF THE INVENTION

The present process is based upon a discovered linear relationship between the lignin content of wood and wood pulp and the ratio of elemental carbon to elemental hydrogen in the sample. The method requires sample prepparation by reduction of particle size when necessary and drying of the sample particles to a standardized moisture content. The dried sample is then analyzed to determine the ratio of carbon to hydrogen in the sample and the lignin content then can be linearly equated to the measured ratio.

It is a first object of this present method and apparatus to provide a reliable and rapid process of measuring directly the lignin content of wood materials, such as raw wood or wood pulp. The lignin content of wood has useful laboratory applications. The measurement of lignin content in pulp is useful in controlling pulping operations for maximum efficiency and in maintaining uniformity of pulp characteristics.

Another object of the invention is to provide a practically useful method of determining lignin content which eliminates the necessity of measuring the quantity of the sample being tested.

Another object of the invention is to provide a method which can be readily adapted to an automated measurement apparatus so as to make possible direct measurement of lignin content in a simple and quick manner adaptable to process control in pulping operations.

These and further objects will be evident from the following disclosure, which sets out the essential steps of the method and the manner by which these steps may be utilized in wood and wood pulp procedures.

DESCRIPTION OF THE DRAWINGS

FIG. 1 is a flow diagram illustrating the steps of the process and appaartus elements as they relate to a sample of wood;

FIG. 2 is a similar flow diagram relating to testing of wood pulp; and

FIG. 3 is a graph illustrating theoretical and experimental results.

PREFERRED EMBODIMENT OF THE INVENTION

The complexity of wood lignins has made measurement of lignin content difficult. Prior measurement techniques have generally been indirect, yielding numerical results which require quantitative measurements of initial samples. The theoretical basis for the present method is that lignin or lignin-like compounds in wood or wood pulp have a distinctly different elemental composition than the carbohydrate components (cellulose and hemicelluloses) of the same material. This theoretical assumption has led to the present method of obtaining useful information concerning lignin content and wood delignification.

The present practical method is based on the theoretical assumption that wood lignins comprise approximately 67.5% carbon and 6.0% hydrogen. These figures are recognized in prior industry literature. Since the carbohydrate components of wood are composed of anhydromonose units with the exception of the two terminal monose units, it is believed quite accurate to consider their elemental composition to be 44.4% carbon and 6.2% hydrogen. From this information concerning the elemental composition of the lignin and carbohydrate fractions of wood or wood pulp, and ignoring the contributions of non-lignin, non-carbohydrate components (extractives), it is possible to derive a mathematical linear expression that predicts lignin content from elemental composition ratios. The resulting equation is linear and is theoretically stated as follows:

$$\text{percent lignin} = -178.7 + 25 \ (C/H)$$

In the above equation, C equals the percentage of elemental carbon in a sample of wood or wood pulp and H equals percentage of elemental hydrogen in the sample. This theoretical expression of lignin content is plotted as line 10 in FIG. 3.

Building upon this theoretical evaluation, experiments have been conducted on samples of pulp from both softwood and hardwood with varying lignin content, and the results have been compared by dual use of other established tests of indirectly measuring lignin content. Examples of experimental results yielded by such prior tests are plotted in FIG. 3 and are averaged along line 20. It is to be noted that the slope of the experimental results of line 20 is parallel to the slope of the theoretical relationship illustrated at line 10, but is displaced slightly from the theoretical relationship. This displacement is understandable from the assumptions set out above, which ignore the extractice content of wood, which constitutes approximately 10–15% of its chemical structure. Some of the extractive materials vary the measured results due to their elemental similarity to lignins. To generalize the practical mathematical relationship between lignin content and the carbon to hydrogen ratio is described by the following equation:

$$\text{percent lignin} = X + Y \ (C/H)$$

Where C equals the percentage of elemental carbon in the tested sample and H equals the percentage of elemental hydrogen in the tested sample and X and Y are constants determined by calibration from samples of known lignin content and C, H ratios at a standardized moisture content.

As an example of the application of this general equation to actual test results, the average experimental test results shown in FIG. 3 can be expressed by the equation:

$$\text{percent lignin} = -183.9 + 25 \ (C/H)$$

The values of the constants X and Y may vary slightly depending upon test refinements and the degree of control exercised, particularly in relation to moisture content.

To prove the present method, a sample of Jack Pine chips was divided into seven equal charges and cooked with 30% active alkali ($Na_2CO_3$ basis) with 25% sulfidity in laboratory pulp digestors. The digestor bombs were removed at intervals to obtain pulp samples with varying lignin contents. The time intervals used were 0 minutes, 30 minutes, 60 minutes, 90 minutes, 110 minutes, 140 minutes, 160 minutes and 180 minutes. The samples were disintegrated in a blender, washed with water and air dried. They were then milled and screened to obtain sample particles of uniform fine size.

The ground samples were analyzed by conventional techniques to determine lignin content and carbon-hydrogen analysis. Table 1 shows the results of this procedure, the number of each sample increasing with the cooking time described above.

TABLE I

| Sample | Carbon, percent | Hydrogen, percent | Lignin, percent |
| --- | --- | --- | --- |
| 0 | 50.50 | 6.06 | 26.0 |
| 1 | 49.67 | 5.91 | 26.7 |
| 2 | 49.58 | 5.83 | 28.4 |
| 3 | 48.55 | 5.84 | 25.3 |
| 4 | 47.21 | 5.92 | 14.1 |
| 5 | 45.41 | 5.91 | 7.9 |
| 6 | 45.27 | 5.81 | 6.6 |
| 7 | 44.62 | 5.99 | 3.9 |

The specific values plotted by the dots within triangles in FIG. 3 are taken from the analysis set out in Table 1. FIG. 3 compares the line obtained by the conventional indirect regression analysis of lignin content and measured carbon-hydrogen ratio for the samples (line 20) to the theoretically predicted relationship (line 10). Both relationships have the same slope and are displaced vertically by a constant. Further comparison of theoretical and experimental relationships are set out in Table II below, which compares theoretical calculation of lignin content with the experimental data derived from Table I.

TABLE II.—LIGNIN AND CARBON-HYDROGEN RATIOS OBTAINED FROM THEORETICAL CALCULATIONS AND EXPERIMENTAL DATA

| Theoretical calculations | | Experimental Data | |
| --- | --- | --- | --- |
| C/H | Percent lignin | C/H | Percent lignin |
| 8.35 | 30 | 8.33 | 26.0 |
| | | 8.40 | 26.7 |
| | | 8.50 | 28.4 |
| 7.95 | 20 | 8.31 | 25.3 |
| | | 7.97 | 14.1 |
| 7.56 | 10 | 7.68 | 7.9 |
| | | 7.79 | 6.6 |
| 7.16 | 0 | 7.44 | 3.9 |

The above experimental results confirm that the carbon-hydrogen ratio of wood or wood pulp can be used to accurately predict the residual lignin content of Jack Pine wood and kraft pulps. Samples of Aspen were treated similarly to determine whether the technique is applicable to hardwoods. The experimental results confirmed the usefulness of the method, since the measured values also were plotted by the dots within squares positioned along the relationship indicated at line 20 in FIG. 3.

Based upon the above experiments, a practical method of determining the lignin content of wood or wood pulp has been developed. The method and the apparatus used in carrying out the method are illustrated generally by the flow diagrams of FIGS. 1 and 2, FIG. 1 being related to analysis of wood samples and FIG. 2 being related to analysis of pulp samples.

The processes denoted in FIGS. 1 and 2 vary in only the first two steps, relating to disintegration and washing. When analyzing a wood sample as shown in FIG. 1, one must first disintegrate the sample to a very fine particle size in a conventional mill or other disintegrator denoted generally at 11. The particles of wood are then directed to a dryer 12. When analyzing a sample of pulp, disintegration is not necessary since this is generally accomplished in the pulping process. The sample of pulp is first washed in clear water to remove all dissolved materials, including lignin. This is accomplished in a washer designated at 13. The pulp is preferably washed in clear water until no residue remains in the water, all dissolved materials having then separated from the pulp solids. The solids are then directed to a dryer 12.

The method of analysis, beginning with the drying step, is identical in the analysis of both wood and wood pulp samples. The sample is dried in dryer 12 to a known moisture content. As as example, a zero moisture content can be utilized by use of known solvent exchange methods whereby the sample is treated with a volatile solvent (acetone, ethanol, etc.) that is miscible with water. The liquids are subsequently boiled off by subjecting the sample to a stream of hot dry gas or air.

After being dried to a known and constant moisture content (preferably zero), the samples are directed from dryer 12 to a mill 14 which grinds the dried particles and subjects them to a screening process. An example is a conventional Wylie mill.

The prepared samples, after being ground and screened, are directed to an elemental analyzer 15 which is capable of measuring the ratio of carbon and hydrogen in the sample. As an example, the analyzer 15 might be a gas chromatograph wherein the sample is burned in an oxygen-rich atmosphere and the combustion products analyzed by chromatography. Conventional gas chromatographs might be used, or specialized equipment such as those shown in U.S. Pats. Nos. 3,232,851; 3,346,342; 3,304,159; 3,168,378; which are mentioned here only by way of example.

The results of elemental analysis can then be directed to a computer 16 or other apparatus used to calculate the lignin content of the original sample, using the relationship generally expressed by line 20 in FIG. 3, and according to the following general equation:

$$\text{percent lignin} = X + Y(C/H)$$

Where input signal C equals the percentage of elemental carbon in the tested sample and input signal H equals to the percentage of elemental hydrogen in the tested sample and X and Y are pre-selected constants.

The calculation of the lignin content can be accomplished by graphical analysis, by manual mathermatical calculation, or by a properly programmed or special purpose computer, generally indicated in FIGS. 1 and 2 at 16. A visual display unit 19 or other suitable readout apparatus is connected to the output signal of computer 16.

The above method and general apparatus combination have considerable possible impact in wood laboratory and pulping procedures. Tests should be available for analysis of a sample within five minutes. As applied to the analysis of wood samples, the measurement of lignin content is seen today as being primarily a research tool, enabling wood researchers to better analyze particular samples from various species and to thereby assist them in promoting more efficient utilization of natural wood resources. As applied to pulping processes, the measurement of lignin content is important in all types of pulping and bleaching processes, and at all the stages thereof. By drawing samples at selected stages in either a batch or continuous operation, one can more carefully control the introduction of chemicals and vary other operating parameters to more efficiently operate such plants.

The analytical procedure used to obtain the present data differs considerably from that presently required for the purpose of lignin determination. Standard elemental determinations are conducted so that the percent carbon and percent hydrogen can be calculated based on the original sample weight. This is done by measuring the quantity of carbon dioxide and water evolved during combustion of the sample. For direct lignin determinations the major requirement is that the sample be dried completely; then the ratio of the amount of carbon, a fraction of the amount of carbon dioxide evolved, and the amount of hydrogen, a fraction of the amount of water evolved, will give the required C/H ratio. It will not be necessary to weigh samples at all. If adequate arrangements are made to assure complete and rapid drying of each sample the procedure will provide accurate lignin contents for any wood product.

Modern elemental analyzers are essentially specialized gas chromatographs. This type of instrument is perfect for the purpose of lignin determination, because absolutely no weighing is necessary and maintenance should be at a minimum. This procedure can and should be automated around one of these elemental analyzers.

The apparatus used to carry out the above method is a combination of available devices arranged so as to carry out the method steps in proper sequence and with suitable operating control. The scale of the equipment is similar to that used in laboratory research and testing relating to the pulp and paper industry, since only a small sample of material need be tested to determine the ligning content of the source. When testing wood, the disintegrator 11 might be a small chipping apparatus or other suitable mechanical mill for physically tearing the wood fibers or cutting the fibers in a manner similar to that required for pulp preparation. When testing wood pulp, the washer 13 need simply be filter funnels or other filtering devices through which substantial amounts of clear water can be passed while removing all surface liquids and dissolved materials from the pulp fibers. Where necessary, disintegration of a pulp sample can be achieved in a blender prior to the washing step. This serves to disintegrate the sample and might be particularly desirable when testing pulp samples taken early in the pulping process.

The dryer 12 might simply be an oven or even utilize air drying processes. For speed of operation, it is more useful to use an apparatus wherein the sample is subjected to a stream of hot air or gas so as to reduce the moisture content of the sample to zero. Other known and constant moisture contents might be used for testing a sequence of samples but they would require measuring devices to assure that each sample is dried to a constant value. If a moisture content other than zero is utilized, the position of the experimental line 20 (FIG. 3) will be shifted relative to the theoretical line 10.

Mill 14 must simply be an apparatus capable of reducing the particle sizes in the dried sample to that necessary for infeed to analyzer 15. The particle size which is therefore dictated by the intake requirements of analyzer 15 and apparatus can be chosen to meet with such requirements. One example of the mill 14 is a Wylie mill, the particles being ground through a 20 mesh screen in the mill.

The analyzer 15 may be in the form of a gas chromatograph or other suitable analytical equipment capable of determining the carbon and hydrogen content of the prepared sample. These values are then manually or automatically directed to the aparatus 16, which is preferably a special-purpose computer or a properly programmed general purpose computer. It is believed that those skilled in the field of computer usage can properly program the chosen experimentally proven-equation set out above so as to operate computer 16. Computer 16 must solve the equation based on the input signals relating to the ratio of carbon and hydrogen in the sample. The value achieved from this computation provides a direct reading of lignin content. The apparatus 19 might provide a visual readout of the value, or might alternately be connected directly to control equipment for varying the operating conditions of a pulp or bleaching process in response to the measured lignin content.

The apparatus generally indicated in FIGS. 1 and 2 can be a series of selected components which are manually operated to test a chosen sample or series of samples. This apparatus is particularly adapted to automation, and by properly selecting the components to act automatically on a sample, it is believed that the entire test cycle can be achieved in approximately 5 minutes or less. This rapid determination of lignin content will greatly assist in achieving more efficient operation in pulp and bleaching operations and should result in considerable economy throughout such processes.

Having thus described my invention, I claim:

1. A method of determining the lignin content of a sample of wood or wood pulp, comprising the following steps:

drying the sample to a standardized moisture content;

determining the ratio of elemental carbon to elemental hydrogen present in the dried sample; and computing a lignin content value for the sample according to the following linear relationship between the lignin content and the determined ratio of elemental carbon to elemental hydrogen present in the dried sample:

$$\text{Percent lignin} = X + Y(C/H)$$

wherein C/H equals the ratio of elemental carbon to elemental hydrogen present in the sample and wherein X and Y are constants determined by calibration from samples of known lignin content and C/H ratios at the standardized moisture content.

2. The method as set out in claim 1 as applied to a sample of wood pulp, further comprising the following step prior to drying of the sample:

washing the pulp sample in clear water to remove all dissolved materials in the original pulp sample.

3. An apparatus for determining the lignin content of a sample of wood or wood pulp, comprising:

means for drying the sample to a standardized moisture content;

means for determining the ratio of elemental carbon to elemental hydrogen present in the dried sample; and means for computing a lignin content value according to the following linear relation between lignin content and the determined ratio of elemental carbon to elemental hydrogen present in the dried sample:

$$\text{Percent lignin} = X + Y(C/H)$$

wherein C/H equals the ratio of elemental carbon to elemental hydrogen present in the sample and wherein X and Y are constants determined by calibration from samples of known lignin content and C/H ratios at the standardized moisture content.

4. An apparatus as set out in claim 2 for determining the lignin content of a sample of wood, further comprising:

means for disintegrating the original sample prior to drying.

5. An apparatus as set out in claim 2 for determining the lignin content of a sample of wood pulp, further comprising:

means for washing the original sample prior to drying to thereby remove all dissolved materials from the sample.

6. A system for providing a measurement of lignin content (L) in a sample of wood or wood pulp, having a standardized moisture content comprising in combination:

computer means programmed to respond to applied signals (C, H) to provide an output signal (L) with the relationship betwen signals (C, H) and (L) being defind as follows:

$$L = X + Y(C/H)$$

where C/H is the ratio of elemental carbon to elemental hydrogen in the sample and X and Y are constants determined by calibration from samples of known lignin content and C/H ratios at the standardized moisture content;

elemental analysis means coupled with said computer and providing signals (C, H) thereto, with the signal C representing the precentage of carbon in a sample and the signal H representing the percentage of hydrogen in a sample;

and means coupled with the computer means responsive to the output signal L to provide an indication of lignin content.

References Cited

UNITED STATES PATENTS 3,252,759    5/1966    Simon    23—230 PC

JOSEPH SCOVRONEK, Primary Examiner

23—230 PC, 253 R, 253 PC; 260—124